United States Patent [19]

Okada

[11] Patent Number: 5,286,965
[45] Date of Patent: Feb. 15, 1994

[54] ANTICOLLISION SYSTEM FOR OBJECTIVE LENS IN AN OPTICAL DATA RECORDING APPARATUS

[75] Inventor: Tsuyoshi Okada, Yokohama, Japan

[73] Assignee: Matsushita Electric Industrial Co., Ltd., Osaka, Japan

[21] Appl. No.: 886,809

[22] Filed: May 22, 1992

[30] Foreign Application Priority Data

Jun. 5, 1991 [JP] Japan .................................. 3-134394

[51] Int. Cl.⁵ .............................................. G01J 1/20
[52] U.S. Cl. ................................ 250/201.5; 369/44.25
[58] Field of Search ................... 250/201.4, 201.5, 561; 369/44.25, 44.29

[56] References Cited

U.S. PATENT DOCUMENTS

| | | | |
|---|---|---|---|
| 3,974,327 | 8/1976 | Van Dijk | 250/201.5 |
| 4,541,084 | 9/1985 | Oku et al. | 250/201.5 |
| 4,683,560 | 7/1987 | Takeuchi et al. | 369/44.25 |

FOREIGN PATENT DOCUMENTS

| | | |
|---|---|---|
| 60-28034 | 2/1985 | Japan . |
| 60-251529 | 12/1985 | Japan . |
| 64-23428 | 1/1989 | Japan . |

*Primary Examiner*—David C. Nelms
*Attorney, Agent, or Firm*—Spencer, Frank & Schneider

[57] ABSTRACT

An anticollision system for an objective lens for use in an optical data reproducing apparatus. The apparatus is constructed so that the relative distance between the objective lens and a data recording medium is detected, and the objective lens pulled away from the data recording medium to prevent the objective lens from colliding with the data recording medium when the detected relative distance is reduced to a predetermined value or below. Consequently, a collision between the objective lens and the data recording medium can be prevented if the following operation fails or malfunctions.

4 Claims, 2 Drawing Sheets

ANTICOLLISION SYSTEM FOR OBJECTIVE LENS IN AN OPTICAL DATA RECORDING APPARATUS

BACKGROUND OF THE INVENTION

The present invention relates to an anticollision system for an objective lens for use in an optical data reproducing apparatus for reproducing data from a data recording medium by using an optical signal. Examples of such apparatus are the compact disc and photomagnetic disc.

In recent years, an optical data reproducing apparatus has been highlighted widely for use in the industrial field because the data reproducing apparatus has large capacity and high reliability.

An example of a conventional optical data reproducing apparatus will be described hereinafter with reference to the drawings. FIG. 1 shows the structure of a conventional optical data reproducing apparatus. In FIG. 1, reference numeral 1 represents a data recording medium, and a signal is recorded on a recording surface thereof. Reference numeral 2 represents an objective lens which condenses light on a data recording surface of the data recording medium 1. Reference numeral 3 represents optical separation means which separates light transmitted toward the data recording medium 1 from light returning therefrom. Reference numeral 4 represents light emitting means which emits laser light. Reference numeral 5 represents data signal detecting means, reference numeral 6 represents focusing error signal detecting means, and reference numeral 7 represents objective lens driving means.

The operation of the optical data reproducing apparatus constructed as described above will be described hereinafter. First, laser light emitted from the light emitting means 4 passes through the optical separation means 3, and it is condensed by the objective lens 2 and focused on the data recording surface of the data recording medium 1. Light reflected from the data recording medium 1 returns again to the objective lens 2, and it is incident on the data signal detecting means 5, and on the focusing error signal detecting means 6, after it has been separated by the optical separation means 3. The focusing error signal detecting means 6 generates a positive or negative value signal, respectively, depending on whether the data recording medium 1 is positioned on one side of the objective objective lens 2 or on the opposite side thereof, and generates a signal of an amplitude proportionate to the relative distance from the focal point. Since the data recording medium 1, which is rotated by a spindle motor (not shown) produces a facial deflection due to its deformation or vibration, the objective lens 2 is made to follow the facial deflection of the data recording medium 1 by the objective lens driving means 7 by using a focusing error signal obtained by the focusing error signal detecting means 6 so that the objective lens 2 is just brought into focus on the recording surface of the data recording medium 1. At the same time, the data signal detecting means 5 reads a data signal recorded on the data recording medium 1 in the form of a light intensity variation.

In the above-described structure, however, there is a possibility such that, when a following operation for bringing the objective lens 2 into a focus on the recording surface of the data recording medium 1 fails or malfunctions for some reason, the objective lens 2 comes too close to the data recording medium 1 and they collide with each other in the worst case, thus causing the objective lens 2 or the data recording medium 1 to be damaged. In particular, in recent times, there is a tendency toward miniaturization of the optical data reproducing apparatus and the relative distance between the objective lens 2 and the data recording medium 1 is made small, so that the possibility will occur that such a collision, when the following operation fails or malfunctions, is more and more increased.

SUMMARY OF THE INVENTION

It is an object of the present invention to provide an anticollision system for an objective lens for preventing an objective lens from colliding with a data recording medium.

In order to attain the above-described object, the present invention provides an anticollision system which operates to detect a state where the distance between an objective lens and a data recording medium, an output amount of a read-out data signal, or a reflected light quantity has decreased to a certain given value or less and to keep the objective lens away from the data recording medium.

Therefore, according to the present invention, the objective lens is kept away from the data recording medium when the distance between the objective lens and the data recording medium, an output signal level for data read out from the data recording medium, or a quantity of light reflected from the data recording medium is detected, and the detected value has decreased to a certain given value or less. Accordingly, the present invention has an advantage such that it is made possible to prevent a collision from occurring between the objective lens and the data recording medium.

DESCRIPTION OF THE PREFERRED EMBODIMENTS

An anticollision system for an objective lens of the present invention will be described hereinafter with reference to the drawings.

Figure 1:
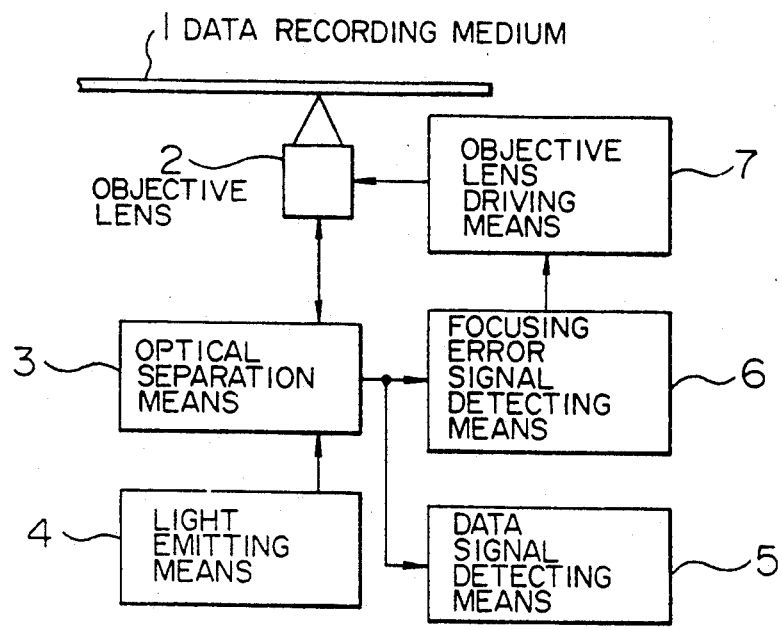
FIG. 1 is a block diagram showing the structure of a conventional optical data reproducing apparatus.
Figure 2:
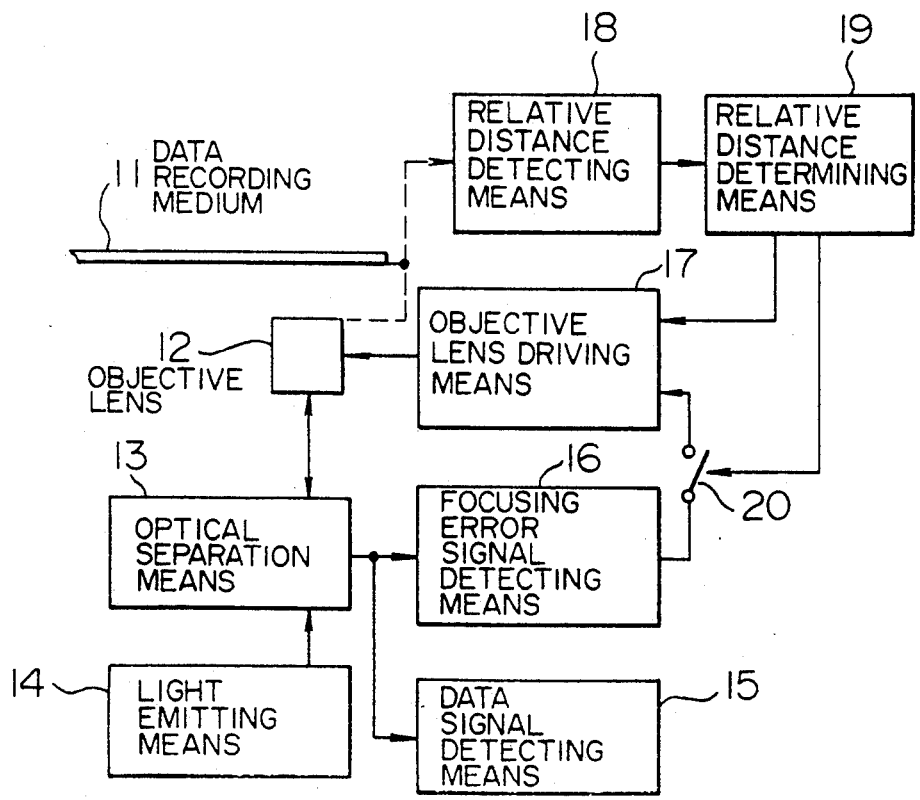
FIG. 2 is a block diagram showing the structure of a first embodiment of the present invention.

FIG. 2 is a block diagram showing an anticollision system for an objective lens of a first embodiment of the present invention. In FIG. 2, reference numeral 11 represents a data recording medium such as a compact disc having a recording surface of which a signal is recorded, and which is rotated by a spindle motor not shown. Reference numeral 12 represents an objective lens which condenses light on the data recording surface of the data recording medium 11. Reference numeral 13 represents optical separation means which separates light transmitted toward the data recording medium 11 from light returning from the data recording medium 11. Reference numeral 14 represents light emitting means which emits laser light toward the optical separation means 13. Reference numeral 15 represents data signal detecting means, reference numeral 16 represents focusing error signal detecting means, and reference numeral 17 represents objective lens driving means for driving the objective lens 12. Reference numeral 18 represents relative distance detecting means for detecting the relative distance between the objective lens 12 and the data recording medium 11, and reference numeral 19 represents relative distance determining means for determining whether or not the detected distance has a predetermined value or is less than the predetermined value. Reference numeral 20 represents a switch for either connecting or disconnecting the focusing error signal detecting means 16 and the objective lens driving means 17 in accordance with an indication from the relative distance determining means 19.

Next, the operation of the first embodiment will be described. Normally, the switch 20 is in an ON state, and the focusing error signal detecting means 16 and the objective lens driving means 17 are connected with each other. First, laser light emitted from the light emitting means 14 passes through the optical separation means 13 and is condensed by the objective lens 12 and brought into a focus on the data recording surface of the data recording medium 11. The laser light reflected by the data recording medium 11 returns again to the objective lens 12 and is then incident on the data signal detecting means 15, and on the focusing error signal detecting means 16, after it has been separated by the optical separation means 13. The focusing error signal detecting means 16 generates a positive or negative value signal, respectively, depending on whether the data recording medium 11 is positioned on one side of the focal point of the objective lens 12 or on the opposite side thereof such signal having an amplitude proportionate to the relative distance from the focal point, and outputs the generated signal to the objective lens driving means 17. Since the data recording medium 11, which is rotated by a spindle motor, produces a facial deflection due to its deformation or vibration, the objective lens 12 is made to follow the facial deflection of the data recording medium 11 by the objective lens driving means 17 by using a focusing error signal obtained by the focusing error signal detecting means 16 so that the objective lens 12 is just brought into focus on the recording surface of the data recording medium 11. At the same time, the data signal detecting means 15 reads a data signal recorded on the data recording medium 11 in the form of a light intensity variation.

On the other hand, since the distance between the objective lens 12 and the data recording medium 11 has been detected by the relative distance detecting means 18, when the following operation for bringing the objective lens 12 into a focus on the recording surface of the data recording medium 11 fails or malfunctions for some reason, so that the objective lens 12 comes too close to the data recording medium 11, the relative distance determining means 19 operate to cut off the connection between the focusing error signal detecting means 16 and the objective lens driving means 17 by turning off the switch 20, and further the relative distance determining means 19 instructs the objective lens driving means 17 to move the objective lens 12 in a direction such as to increase the relative distance between the data recording medium 11 and the objective lens 12.

As an example of a specific relative distance detecting means 18 for use in the present embodiment, an electrostatic capacity type sensor is disposed on the side of the objective lens 12 to thereby measure the electrostatic capacity between the objective lens 12 and the data recording medium 11, thereby detecting the relative distance therebetween.

As described above, according to the first embodiment, the relative distance between the objective lens 12 and the data recording medium 11 is detected by the relative distance detecting means 18, and the objective lens 12 is kept away from the data recording medium 11 when the relative distance has decreased so as to reach a predetermined value or less, thereby making it possible to prevent the objective lens 12 from colliding with the data recording medium 11.

Figure 3:
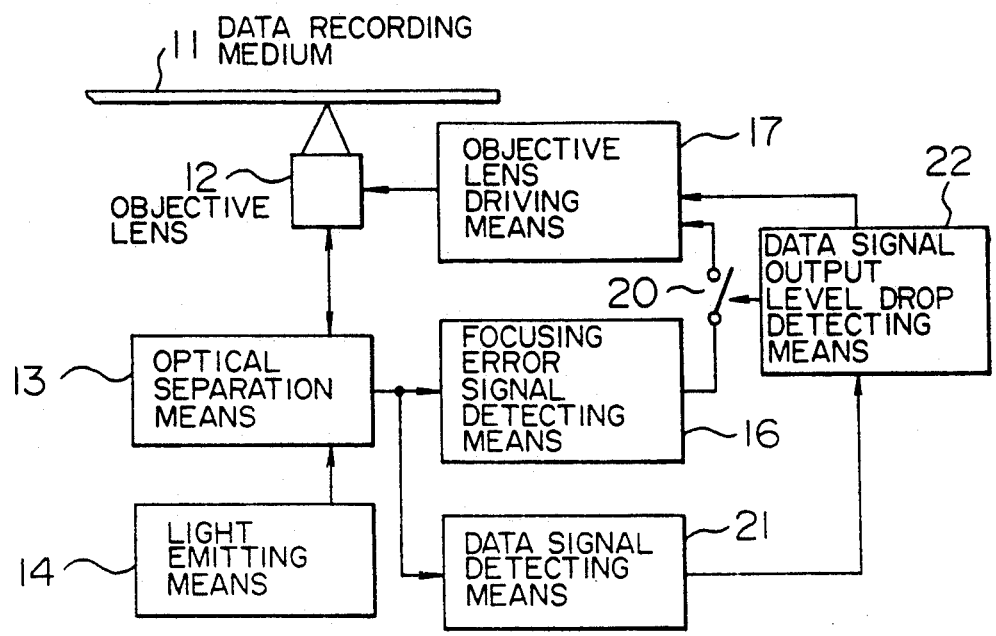
FIG. 3 is a block diagram showing the structure of a second embodiment of the present invention.

A second embodiment of the present invention will now be described with reference to FIG. 3. In FIG. 3, a description of the elements which are the same as those of the first embodiment is omitted. Reference numeral 21 represents data signal detecting means for reading a data signal recorded on the data recording medium 11 in the form of a light intensity variation and for outputting the read-out data signal. Reference numeral 22 represents data signal output level drop detecting means which receives a data signal outputted from the data signal detecting means 21, turns off the switch 20 when the output level of the data signal drops below a certain given value for a given period of time, and outputs a signal for driving the objective lens to the objective lens driving means 17.

Next, the operation of the second embodiment will be described. When the objective lens 12 comes too close to the data recording medium 11, it moves away from a just focused position thereon. Consequently, the output signal level falls to reach a signal level similar to a signal level which would be reached when the objective lens 12 is sufficiently apart from the data recording medium 11. Therefore, when the data signal output level detected by the data signal detecting means 21 has dropped to reach the above-described signal level for a given period of time, while the objective lens 12 is moving in the direction of the data recording medium 11, there is a danger such that the objective lens 12 comes close to the data recording medium 21, and, in the worst case, collides with the data recording medium 21. In such a case, the data signal output level drop detecting means 22 operates to cut off the connection between the focusing error signal detecting means 16 and the objective lens driving means 17 by turning off the switch 20, and instructs the objective lens driving means 17 to pull back the objective lens 12 in the direction away from the data recording medium 11.

Further, the output level drop of the data signal occurs also in a case where the data recording medium 11 has a flaw. In this case, it cannot be said that the following operation has fallen into a state of runaway, but both the data signal generation and the following operation are restored again to normal states thereof, respectively, when the position of the flaw on the data recording medium 11 has been passed by. Therefore, as described above, the objective lens 12 is pulled back only when the level of the data signal, which is detected for a given period of time, does not exceed a certain given value. The other operations are similar to those of the first embodiment.

Thus, the anticollision system of the second embodiment is constructed such that the data signal output level drop detecting means 22 operates to pull back the objective lens 12 to be apart from the data recording medium 11 only when the output level of a data signal read out from the data recording medium 11 remains below a certain given level for a given period of time, whereby it is made possible to prevent the objective lens 12 from colliding with the data recording medium 11.

Figure 4:
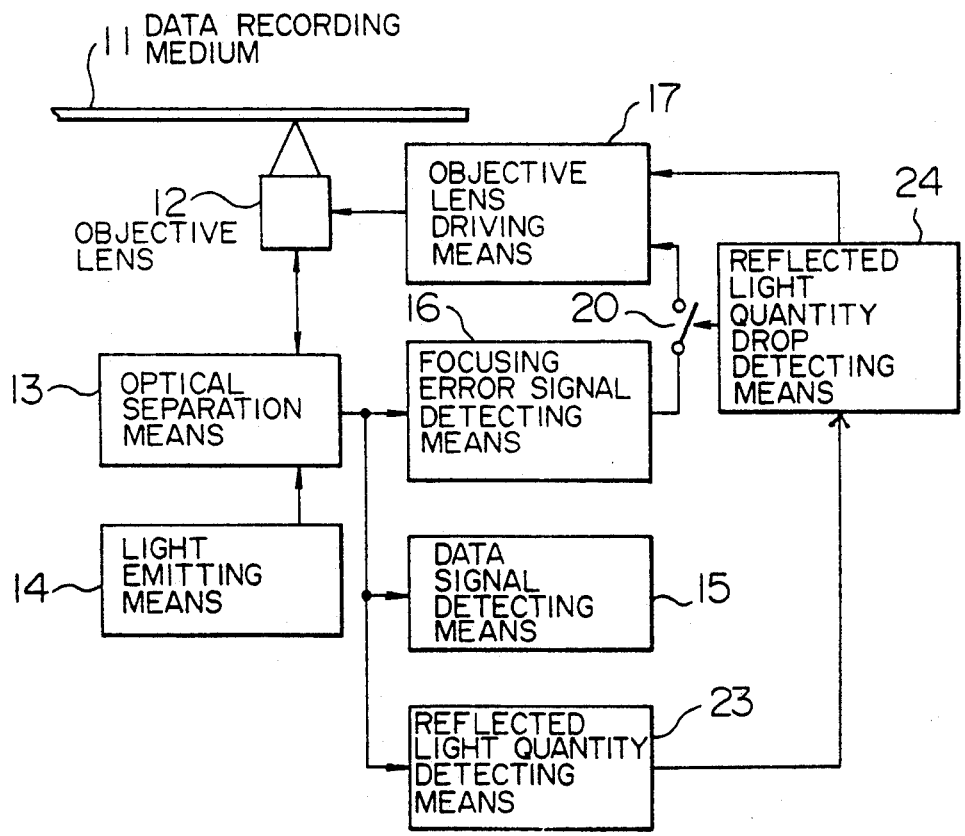
FIG. 4 is a block diagram showing the structure of a third embodiment of the present invention.

Next, a third embodiment of the present invention will be described with reference to FIG. 4. In FIG. 4, a description of the elements of the third embodiment which are the same an those of the first and second embodiments, respectively, will be omitted. Reference numeral 23 represents reflected light quantity detecting means for detecting the quantity of light reflected from the data recording medium 11, and reference numeral 24 represents reflected light quantity drop detecting means which operates to turn off the switch 20, when the quantity of reflected light detected by the reflected light quantity detecting means 23 drops for a given period of time, and outputs a signal for driving the objective lens 12 to the objective lens driving means 17.

The operation of the third embodiment will how be described. When the objective lens 12 comes too close to the recording medium 11, it moves away from a just focused position thereof. Consequently, the quantity of reflected light decreases to a reflected light quantity level similar to that which would be detected when the objective lens 12 is sufficiently apart from the data recording medium 11. Therefore, when the reflected light quantity level detected by the reflected light quantity detecting means 23 has dropped to the above-mentioned reflected light level for a given period of time, the reflected light quantity drop detecting means 24 determines the occurrence of that state, cuts off the connection between the focusing error signal detecting means 16 and the objective lens driving means 17, and instructs the objective lens driving means 17 to pull back the objective lens 12 to be apart from the data recording medium 11.

Further, a drop of the reflected light quantity occurs also when the data recording medium 11 has a flaw. In this case, it cannot be said that the following operation has fallen into a state of runaway, and both the reflected light quantity and the following operation may be restored again to normal states, respectively, when the position of the flaw on the data recording medium 11 has been passed by. Therefore, as described above, the objective lens 12 is pulled back only when a quantity level of reflected light detected during a given period of time does not exceed a certain given value. The other operations are similar to those of the first embodiment.

As described above, according to the third embodiment, the quantity of reflected light from the recording medium 11 is detected by the reflected light quantity detecting means 23, and the objective lens 12 is kept apart from the data recording medium 11 by the reflected light quantity drop detecting means 24 when the detected reflected light quantity level drops below a certain value for a given period of time. Thus, it is possible to prevent the objective lens 12 from colliding with the data recording medium 11.

I claim:

1. An anticollision system for an objective lens for use in an optical data reproducing apparatus, said optical data reproducing apparatus comprising:
    a rotatable data recording medium having data recorded on a data recording surface thereof;
    light emitting means for emitting a laser beam;
    an objective lens positioned adjacent said data reading means, said objective lens condensing the laser beam emitted from said light emitting means on the data recording surface of said data recording medium;
    optical separation means for separating the laser beam transmitted toward said data recording medium from a laser beam reflected therefrom;
    data signal detecting means receiving the reflected laser beam from said optical separation means, detecting a data signal by reading in the form of light intensity variations the data signal recorded on said data recording medium, and outputting the detected data signal;
    focusing error signal detecting means receiving the reflected laser beam from said optical separation means, detecting a focusing error on the basis of the reflected light beam, and outputting a focusing error signal at an output terminal thereof;
    objective lens driving means having first and input terminals, said objective lens driving means receiving the focusing error signal from the output terminal of said focusing error signal detecting means at the first input terminal thereof and driving said objective lens in accordance with the focusing error signal, said objective lens thereby being focused on the data recording surface of said data recording medium;
    a normally-closed switch interposed between the output terminal of said focusing error signal detecting means and the first input terminal of said objective lens driving means;
    relative distance detecting means having an output terminal, said relative distance detecting means detecting a relative distance between said objective lens and said data recording medium; and
    relative distance determining means having an input terminal connected to the output terminal of said relative distance detecting means, a first output terminal for delivering a first drive signal to said normally-closed switch, and a second output terminal for delivering a second drive signal to the second input terminal of said objective lens driving means, said relative distance determining means determining whether or not the relative distance between said objective lens and said data recording medium determined by said relative distance detecting means has a predetermined value or less and, upon determining that the detected relative distance represented by the output signal at the output terminal of said relative distance detecting means has the predetermined value or less, delivers the first drive signal from the first output terminal thereof to open said normally-closed switch and delivers the second drive signal from the second output terminal thereof to drive said objective lens away from the data recording surface of said data recording medium.

2. An anticollision system according to claim 1, wherein said relative distance detecting means includes an electrostatic capacity type sensor fixed to said objective lens, said sensor generating an output signal representing the relative distance between said objective lens and data receiving medium by detecting a value of the electrostatic capacity formed between said objective lens and said data recording medium.

3. An anticollision system for an objective lens for use in an optical data reproducing apparatus, said optical data reproducing apparatus comprising:
    a rotatable data recording medium having data recorded on a data recording surface thereof;

light emitting means for emitting a laser beam;

an objective lens positioned adjacent said data recording means, said objective lens condensing the laser beam emitted from said light emitting means on the data recording surface of said data recording medium;

optical separation means for separating the laser beam transmitted toward said data recording medium from a laser beam reflected therefrom;

data signal detecting means receiving the reflected laser beam from said optical separation means, detecting a data signal by reading in the form of light intensity variations the data signal recorded on said data recording medium, and outputting the detected data signal at an output terminal thereof;

focusing error signal detecting means for receiving the reflected laser beam from said optical separation means, detecting a focusing error on the basis of the reflected light beam, and outputting a focusing error signal at an output terminal thereof;

objective lens driving means moving first and input terminals, said objective lens driving means receiving the focusing error signal from the output terminal of said focusing error signal detecting means at the first input terminal thereof and driving said objective lens in accordance with the focusing error signal, said objective lens thereby being focused on the data recording surface of said data recording medium;

a normally-closed switch interposed between the output terminal of said focusing error signal detecting means and the first input terminal of said objective lens driving means;

data signal output level drop detecting means having an input terminal connected to the output terminal of said data signal detecting means, a first output terminal for delivering a first drive signal to drive said normally-closed switch and a second output terminal for delivering a second drive signal to the second input terminal of said objective lens driving means, for detecting a drop in an input level of the data signal from said data signal detecting means and, upon detecting that the output level of the data signal from said data signal detecting means has dropped to a predetermined level or below for a predetermined period of time, said data signal output level drop detecting means delivers the first drive signal from the first output terminal thereof to open said normally-closed switch and delivers the second drive signal from the second output terminal thereof to drive continuously said objective lens away from the data recording surface of said data recording medium while the output level of the data signal stays at the predetermined level or below.

4. An anticollision system for an objective lens for use in an optical data reproducing apparatus, said optical data reproducing apparatus comprising:

a rotatable data recording medium having data recorded on a data recording surface thereof;

light emitting means for emitting a laser beam;

an objective lens positioned adjacent said data reading means, said objective lens condensing the laser beam emitted from said light emitting means on the data recording surface of said data recording medium;

optical separation means for separating the laser beam transmitted toward said data recording medium from a laser beam reflected therefrom;

data signal detecting means receiving the reflected laser beam from said optical separation means, detecting a data signal by reading in the form of light intensity variations the data signal recorded on said data recording medium, and outputting the detected data signal;

focusing error signal detecting means receiving the reflected laser beam from said optical separation means, detecting a focusing error on the basis of the reflected light beam, and outputting a focusing error signal at an output terminal thereof;

objective lens driving means moving first and input terminals, said objective lens driving means receiving the focusing error signal from the output terminal of said focusing error signal detecting means at the first input terminal thereof and driving said objective lens in accordance with the focusing error signal, said objective lens thereby being focused on the data recording surface of said data recording medium;

a normally-closed switch interposed between the output terminal of said focusing error signal detecting means and the first input terminal of said objective lens driving means;

reflected light quantity detecting means having an output terminal, said reflected light quantity detecting means receiving the reflected laser beam from said optical separation means and detecting a light quantity of the reflected laser beam; and reflected light quantity drop detecting means having an input terminal connected to the output terminal of said reflected light quantity detecting means, a first output terminal for delivering a first drive signal to said normally-closed switch and a second output terminal for delivering a second drive signal to the second input terminal of said objective lens driving means, said reflected light quantity drop detecting means detecting a drop in a light quantity level of the reflected laser beam detected by said reflected light quantity detecting means and, upon detecting that the light quantity level of the reflected laser beam detected by said reflected light quantity detecting means has dropped to a predetermined light quantity level or below for a predetermined period of time, said reflected light quantity drop detecting means delivers the first drive signal from the first output terminal thereof to open said normally-closed switch and delivers the second drive signal from the second output terminal thereof to drive continuously said objective lens away from the data recording surface of said data recording medium while the light quantity level of the reflected laser beam stays at the predetermined light quantity level or below.

* * * * *